Patented Feb. 12, 1924.

1,483,507

UNITED STATES PATENT OFFICE.

CLARENCE J. BROCKBANK, OF PHILADELPHIA, PENNSYLVANIA, ASSIGNOR TO ROSS-TACONY CRUCIBLE COMPANY, OF PHILADELPHIA, PENNSYLVANIA, A CORPORATION OF PENNSYLVANIA.

REFRACTORY ARTICLE AND METHOD OF MAKING THE SAME.

No Drawing. Application filed July 6, 1923. Serial No. 649,961.

*To all whom it may concern:*

Be it known that I, CLARENCE J. BROCKBANK, a British subject, residing at Philadelphia, in the county of Philadelphia and State of Pennsylvania, have invented a new and useful Improvement in Refractory Articles and Methods of Making the Same, of which the following is a specification.

The invention relates to improvements in graphitic refractory articles of manufacture such as metal melting crucibles or pots, bricks, stoppers, tubes, retorts and the like, but more particularly to crucibles composed of graphite and silicon carbide, and the invention further relates to improvements in the method of manufacturing such refractory articles of manufacture.

Heretofore in the manufacture of such articles, more particularly crucibles composed of graphite and silicon carbide, it has been customary to bond the graphite and the silicon carbide or other inert refractory with either clay or a temporary bond such as tar. Such articles unless protected by a refractory glaze rapidly soften or rot due to oxidation (combustion) of the graphite and consequent loosening of the entire structure, and they can therefore only be used under reducing conditions of firing which are practically unattainable in commercial practice. Glazes applied by painting, dipping or spraying do not adhere to the body and do not afford protection against oxidation.

The principal object of the present invention is to obviate the above mentioned defects and disadvantages as well as other defects and disadvantages which are well known to those skilled in the art.

I have discovered that articles of the character above referred to cannot be satisfactorily glazed unless the surface glaze and the permanent bond in the body itself have approximately the same coefficients of expansion and other physical characteristics. By my invention, which I will now describe, I produce or provide with ease and certainty both a permanent body bond and a surface glaze, and this I do by the use of non-ceramic materials and without degrading the highly refractory properties of the principal components of the articles.

For the sake of a further description of the invention the following example is given:

I first mix, in the dry state, the following materials in the proportions given, although it is understood that modifications may be made in these proportions within the spirit of my invention:

| | Parts by weight. |
|---|---|
| Powdered graphite | 50 |
| Powdered silicon carbide | 50 |
| Powdered silicon | 10 |

I may replace a proportion of the silicon carbide by fused alumina, or powdered quartz, as I have found that such replacement if not exceeding 10 parts by weight will not appreciably affect the refractory value of the article while reducing the material cost.

To the above mixture I now add solution of an adhesive obtained as a by-product in the manufacture of sulphite paper pulp, molasses, tar or any other suitable temporary bond and remix until thoroughly incorporated, after which the mixed material is moulded into the shape desired by pressing in moulds or spinning as is customary in the art of manufacturing crucibles.

After seasoning until dry and hard, the moulded article is placed in a sagger and heated to a temperature of 1300–1600° F. for eight hours. During this heating the silicon which has a high vapor pressure at this temperature partially diffuses and penetrates the pores of the entire mass. It is also probable that there is some reaction between the graphite and the silicon vapor whereby the same is partially silicidized and converted to silicon carbide. The greater proportion of the silicon, however, remains in the body in the elementary condition. After this baking operation the articles are dull black in color and coherent in structure, but they have not the hardness and resonance necessary in a refractory article of this character. This is produced by the following operation which develops both the permanent body bond and surface glaze. The articles are immersed until the pores are saturated, which usually takes about one hour, in a 10% to 20% solution of caustic soda. A vigorous effervescence takes place due to the liberation of hydrogen by the reaction of the alkali with the silicon in the body. The article is then dried and baked in an oven at a cherry red heat for approximately one hour. During this operation the sodium silicate formed in the body by the chemical union of the silicon and the alkali, exudes to the surface, leaving a small proportion only in the body and producing a dense, hard refractory article, coated with a continuous glaze, which affords complete protection against surface oxidation.

It will be obvious to those skilled in the art that modifications may be made in details of procedure and in mere matters of form without departing from the spirit of the invention which is not to be limited otherwise than as the prior art and the appended claims may require, and since the invention is of a chemical nature, I reserve to myself the benefit of the doctrine of equivalents established in such cases.

I claim:

1. A dense hard refractory graphitic article of manufacture having a body bond and a continuous glaze of non-ceramic material and of the same coefficient of expansion and other physical characteristics.

2. The method of making a graphitic refractory article of manufacture which consists in incorporating silicon along with graphite and an inert refractory and a temporary bond, moulding or shaping and seasoning the admixture, heating the moulded article to volatilize the silicon and cause it to diffuse and penetrate the pores of the mass, immersing the article in a solution of caustic soda to effect a reaction between the alkali and silicon producing a silicate, and heating the article to cause the silicate to exude to the surface leaving a small proportion only in the body and providing a continuous glaze.

3. In the art of making graphitic refractory articles containing a refractory the, improvement which consists in diffusing silicon throughout the pores of the article by incorporation and heating, converting the diffused silicon into silicate by treating the article with an alkali, and exuding the silicate to the surface of the article by the application of heat.

C. J. BROCKBANK.